(12) United States Patent
Fukuta et al.

(10) Patent No.: US 8,440,366 B2
(45) Date of Patent: May 14, 2013

(54) SOLID POLYMER ELECTROLYTE FUEL CELL MEMBRANE WITH ANION EXCHANGE MEMBRANE

(75) Inventors: Kenji Fukuta, Yamaguchi (JP); Takenori Isomura, Yamaguchi (JP); Hiroyuki Yanagi, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 280 days.

(21) Appl. No.: 12/808,212

(22) PCT Filed: Dec. 17, 2008

(86) PCT No.: PCT/JP2008/072958
§ 371 (c)(1), (2), (4) Date: Jun. 15, 2010

(87) PCT Pub. No.: WO2009/081812
PCT Pub. Date: Jul. 2, 2009

(65) Prior Publication Data
US 2010/0266928 A1    Oct. 21, 2010

(30) Foreign Application Priority Data
Dec. 21, 2007   (JP) .................. 2007-329549

(51) Int. Cl.
*H01M 8/10*        (2006.01)
(52) U.S. Cl.
USPC ........................ 429/492; 429/483; 429/479
(58) Field of Classification Search .................. 429/492, 429/483, 479
See application file for complete search history.

(56) References Cited

U.S. PATENT DOCUMENTS

2002/0127474 A1 * 9/2002 Fleischer et al. .............. 429/309
2003/0168404 A1 * 9/2003 Mika et al. .................... 210/639
2010/0081029 A1 * 4/2010 Fukuta et al. .................. 429/33

FOREIGN PATENT DOCUMENTS

| JP | 07-246336 A | 9/1995 |
| JP | 11-135137 A | 5/1999 |
| JP | 11-273695 A | 10/1999 |
| JP | 2000-331693 A | 11/2000 |
| JP | 2002-100373 A | 4/2002 |
| JP | 2002-329500 A | 11/2002 |
| JP | 2002-367626 A | 12/2002 |
| JP | 2007-042617 A | 2/2007 |
| JP | 2007-188788 A | 7/2007 |
| WO | 20087/004716 A1 | 1/2007 |
| WO | WO 2007004716 A1 * | 1/2007 |
| WO | 2007/072842 A1 | 6/2007 |
| WO | WO 2007072842 A1 * | 6/2007 |
| WO | 2008/120675 A1 | 10/2008 |

OTHER PUBLICATIONS

International Search Report Dated Apr. 14, 2009.
Extended European Search Report dated Dec. 14, 2010.

* cited by examiner

*Primary Examiner* — Zachary Best
(74) *Attorney, Agent, or Firm* — Norris McLaughlin & Marcus PA (57) ABSTRACT

Disclosed is a solid polymer electrolyte fuel cell membrane comprising an anion exchange membrane that contains a hydrocarbon-based anion exchange resin, wherein the water permeability at 25° C. is 1400 g m$^{-2}$ hr$^{-1}$ or greater, the anion exchange capacity is 0.2 to 5.0 mmol·g$^{-1}$, the percentage of water content at 25° C. is 7% by weight or greater, and the thickness is 3 to 50 μm. It is especially preferable as a solid polymer electrolyte fuel cell membrane when said anion exchange membrane is an ion exchange membrane with a 5 to 15 μm-thick porous membrane substrate, wherein the voids in said porous membrane are filled with a hydrocarbon-based anion exchange resin.

5 Claims, 1 Drawing Sheet

SOLID POLYMER ELECTROLYTE FUEL CELL MEMBRANE WITH ANION EXCHANGE MEMBRANE

This application is a 371 application of PCT/JP2008/072958 filed Dec. 17, 2008, which claims priority to the Japanese application 2007-329549 filed Dec. 21, 2007.

TECHNICAL FIELD

The present invention relates to a solid polymer electrolyte fuel cell membrane, a membrane-electrode assembly and a solid polymer electrolyte fuel cell in which the membrane is incorporated. The solid polymer electrolyte fuel cell membrane of the present invention comprises an anion exchange membrane.

BACKGROUND ART

Solid polymer fuel cell is a fuel cell using, as the electrolyte, a solid polymer such as ion exchange resin or the like. This fuel cell has a feature that its operating temperature is relatively low.

Figure 1:
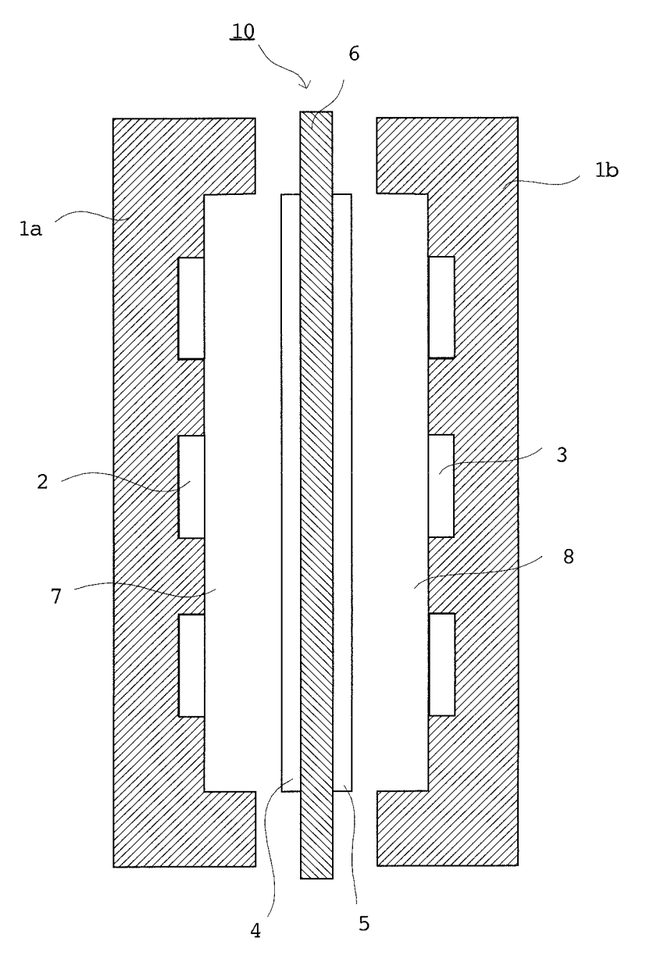
FIG. 1 is a conceptual drawing of the basic structure of solid polymer fuel cell.

The solid polymer fuel cell, as shown in FIG. 1, has a basic structure in which the space formed inside cell partition walls 1a and 1b is divided by an assembly 10. The assembly 10 comprises a solid polymer electrolyte membrane 6 and a fuel diffusion electrode 4 and an oxidant diffusion electrode 5, each bonded to one side of the membrane 6. By dividing the space formed inside the cell partition walls 1a and 1b with the assembly 10, a fuel chamber 7 and an oxidant chamber 8 are formed inside the cell partition walls. The fuel chamber 7 communicates with the outside of cell via a fuel passage 2 formed in the cell partition wall 1a. The oxidant chamber 8 communicates with the outside of the cell via an oxidant passage 3 formed in the cell partition wall 1b.

In the solid polymer fuel cell having the above basic structure, a fuel composed of hydrogen gas, methanol or the like is fed into the fuel chamber 7 via the fuel passage 2. Meanwhile, an oxygen-containing gas (to act as an oxidant) such as oxygen, air or the like is fed into the oxidant chamber 8 via the oxidant passage 3. When, in this state, an external load circuit (not shown) is connected to the diffusion electrodes 4 and 5, the fuel cell supplies an electric energy to the external circuit, according to the following reaction mechanism.

When a cation exchange electrolyte membrane is used as the solid polymer electrolyte membrane 6, the catalyst contained in the fuel diffusion electrode 4 contacts with a fuel, generating proton. The proton (hydrogen ion) passes through the solid polymer electrolyte membrane 6 and moves toward the oxidant chamber 8. The proton, which has reached the oxidant chamber 8, reacts with the oxygen of oxidant by the action of the catalyst contained in the oxidant diffusion electrode 5 to generate water. Meanwhile, the electron generated in the fuel diffusion electrode 4 together with the proton passes through the external load circuit and reaches the oxidant diffusion electrode 5. The external load circuit utilizes the energy generated in the above reaction mechanism, as an electric energy.

In the solid polymer fuel cell using, as the solid polymer electrolyte membrane, a cation exchange electrolyte membrane, a perfluorocarbonsulfonic acid resin membrane is used most commonly as the cation exchange electrolyte membrane.

In the cation exchange type fuel cell using such a perfluorocarbonsulfonic acid resin membrane, however, there is a problem that only a noble metal resistant in the acidic atmosphere is usable as the catalyst, since the reaction for power generation is conducted in a strongly acidic atmosphere. Further, a problem is pointed out that the perfluorocarbonsulfonic acid resin membrane is expensive, posing a limit in the reduction in the cost for fuel cell production.

In order to solve the above problems, it has been investigated to use a hydrocarbon-based anion exchange membrane in place of the perfluorocarbonsulfonic acid resin membrane, and several proposals have been made (Patent Literatures 1 to 4).

In the fuel cell using an anion exchange membrane, the field of reaction is basic. In general, metals are hardly dissolved in a basic atmosphere, unlike in an acidic atmosphere; therefore, metal catalysts other than noble metals are considered to be usable.

In the solid polymer fuel cell using an anion exchange membrane, the ion species moving through the solid polymer electrolyte membrane 6 differs from the ion species of a fuel cell using a cation exchange membrane. In the solid polymer fuel cell using an anion exchange membrane, the mechanism of generation of electric energy is as follows. That is, a fuel such as hydrogen, methanol or the like is fed into the fuel chamber and oxygen and water are fed into the oxidant chamber, whereby, in the oxidant diffusion electrode 5, the catalyst contained in the electrode contacts with the oxygen and the water, generating hydroxide ion ($OH^-$). This hydroxide ion passes through the solid polymer electrolyte membrane 6 made of a hydrocarbon-based anion exchange membrane and reaches the fuel chamber 7, where the hydroxide ion reacts with the fuel fed to the fuel diffusion electrode 4, generating water and electron. The electron generated in the fuel diffusion electrode 4 passes through an external load circuit and reaches the oxidant diffusion electrode 5. The fuel cell utilizes the energy generated by the above reaction, as an electric energy.

Thus, the fuel cell using a solid polymer electrolyte membrane made of an anion exchange membrane differs in the ion species passing through the electrolyte membrane. Further, the fuel cell differs in the moving direction of the ion species. Furthermore, the fuel cell differs in the reaction in each electrode, from the case of using a cation exchange membrane (for example, water reacts at the oxidant electrode).

Hitherto, no sufficient study has been made on the difference in ion species and the movement of water, and no proposal has been made on any electrolyte membrane developed in consideration of a special reaction mechanism occurring in a fuel cell using an anion exchange membrane.

Patent Literature 1 discloses, as the anion exchange membrane for solid polymer electrolyte membrane, an anion exchange membrane comprising a porous membrane (e.g. woven fabric) and a hydrocarbon-based crosslinked polymer having an anion exchange group (e.g. quaternary ammonium salt group or quaternary pyridinium salt group), filled in the porous membrane.

Patent Literature 2 discloses an anion exchange membrane obtained by introducing a quaternary ammonium salt group into a hydrocarbon-based engineering plastic, followed by casting for membrane production.

Patent Literature 3 discloses an anion exchange membrane obtained by graft-polymerizing a hydrocarbon-based monomer having an anion exchange group, to a substrate composed of a fluorine-containing polymer.

In any of the Patent Literatures 1 to 3, the main aim is to solve the problem of reduction in methanol permeability, which problem is to be solved also in the direct methanol fuel cell using a cation exchange membrane.

In order to enhance the adhesion between a solid polymer electrolyte membrane composed of a cation or anion exchange membrane and a catalyst electrode layer, Patent Literature 4 proposes adhesion of a polymer having an ion exchange group of opposite polarity from the polarity of the ion exchange membrane onto the ion exchange membrane. As the ion exchange membrane, there is used an anion exchange membrane comprising a polyethylene porous film substrate and a hydrocarbon-based, crosslinked anion exchange resin filled in the substrate. In the Patent Literature 4, it is described that the ion exchange membrane obtained can be endowed with mechanical strength and flexibility and can have a low electric resistance by being made in a thin state. However, in the Patent Literature 4, there is no mention on a constitution based on the full consideration of the above-mentioned special reaction mechanism when an anion exchange membrane is used.

Patent Literature 1: JP 1999-135137 A
Patent Literature 2: JP 1999-273695 A
Patent Literature 3: JP 2000-331693 A
Patent Literature 4: JP 2007-42617 A

DISCLOSURE OF THE INVENTION

Technical Problem

Thus, the solid polymer electrolyte fuel cell using the above-mentioned hydrocarbon-based anion exchange membrane has a great advantage derived from the use of the anion exchange membrane. However, in this fuel cell, no sufficient consideration has been made on the special reaction mechanism when an anion exchange membrane is used. As a result, the above fuel cell is not sufficiently satisfactory in practical use in, for example, the output voltage, particularly the stability of output voltage in long-term use.

The present invention has a task of providing a membrane for solid polymer electrolyte fuel cell, made of an anion exchange membrane, which has a great advantage derived from the use of the anion exchange membrane and further shows a stable output voltage over a long period.

Technical Solution

The present inventors made a study in order to achieve the above task. The present inventors made investigation on the movement mechanism of chemical species, which is special in the solid polymer fuel cell using an anion exchange membrane, with attention being paid to a fact that the hydroxide ion (which carries electricity) moves from the oxidant diffusion electrode side to the fuel diffusion electrode side. Incidentally, the direction of the movement is opposite from the case of the fuel cell using a cation exchange membrane. Attention was paid further to a fact that the direction of the movement of the hydrated water of hydroxide ion occurring together with the movement of hydroxide ion is also opposite. Attention was paid furthermore to a fact that, while water is formed at the oxidant electrode in the case of the fuel cell using a cation exchange membrane, water is consumed at the oxidant electrode in the case of the fuel cell using an anion exchange membrane.

The present inventors made investigation on these facts. As a result, it was found that the water permeability possessed by anion exchange membrane has a great influence on the output voltage of the fuel cell using the anion exchange membrane.

Based on the above finding, the present inventors made further investigation on membrane while paying attention to the water permeability of anion exchange membrane. As a result, the present inventors succeeded in the development of a fuel cell membrane which achieves the above task, and have completed the present invention.

The present invention lies in a solid polymer electrolyte fuel cell membrane made of an anion exchange membrane which contains a hydrocarbon-based anion exchange resin, wherein the water permeability at 25° C. is 1,400 $g \cdot m^{-2} \cdot hr^{-1}$ or greater, the anion exchange capacity is 0.2 to 5.0 $mmol \cdot g^{-1}$, the water content at 25° C. is 7% by mass or greater, and the thickness is 3 to 50 μm.

The present invention lies also in a membrane-electrode assembly comprising the above-mentioned solid polymer electrolyte fuel cell membrane and a diffusion electrode formed on at least one side of the solid polymer electrolyte fuel cell membrane.

The present invention lies further in a solid polymer electrolyte fuel cell wherein the above-mentioned solid polymer electrolyte fuel cell membrane is incorporated.

Effect of the Invention

The solid polymer electrolyte fuel cell membrane of the present invention has a water permeability of 1,400 $g \cdot m^{-2} \cdot hr^{-1}$ or greater, which is higher than the water permeability of ordinary membranes. As a result, the electric resistance in the vicinity of oxidant diffusion electrode is small. Moreover, the water required for the reaction taking place in the oxidant chamber side diffusion electrode is fed sufficiently to the oxidant diffusion electrode from the fuel chamber side through the membrane.

The solid polymer electrolyte fuel cell membrane of the present invention has a relatively small thickness and a small crosslinking degree so that it can have a high water permeability. For these reasons, the membrane of the present invention has low electric resistance generally. Consequently, The solid polymer fuel cell incorporating the present membrane therein has various advantages derived from the use of anion exchange membrane and gives a high output owing to the small internal resistance. Specifically explaining, the resistance of the solid polymer electrolyte fuel cell membrane of the present invention can be set at 0.005 to 0.6$\Omega \cdot cm^2$, further at 0.005 to 0.3$\Omega \cdot cm^2$ at 40° C. in a wet state, as measured by the AC impedance method. An output voltage of 0.20 to 0.40 V, further 0.25 to 0.55 V can be obtained at a current density of 0.1 $A \cdot cm^{-2}$.

The fuel cell incorporating the solid polymer fuel cell membrane of the present invention therein can maintain such a high output over a long period. Accordingly, the present membrane is extremely useful in the practical use of solid polymer electrolyte fuel cell.

EXPLANATION OF REFERENCE

1 is a cell partition wall; 2 is a fuel passage; 3 is an oxidant gas passage; 4 is a diffusion electrode at fuel chamber side; 5 is a diffusion electrode at oxidant chamber side; 6 is a solid polymer electrolyte (an anion exchange membrane); 7 is a fuel chamber; and 8 is an oxidant chamber.

BEST MODE FOR CARRYING OUT THE INVENTION

The solid polymer electrolyte fuel cell membrane of the present invention comprises an anion exchange membrane containing a hydrocarbon-based anion exchange resin, wherein the water permeability at 25° C. is 1,400 g·m$^{-2}$·hr$^{-1}$ or greater, the anion exchange capacity is 0.2 to 5.0 mmol·g$^{-1}$, the water content at 25° C. is 7% by mass or greater, and the thickness is 3 to 50 µm, preferably 5 to 30 µm, more preferably 5 to 15 µm.

The anion exchange membrane may be any hydrocarbon-based anion exchange membrane as long as its water permeability, etc. satisfy the above ranges. Any anion exchange membrane containing a known hydrocarbon-based anion exchange resin made of a known material can be used with no restriction as long as its water permeability satisfies the above range. It may be, for example, an anion exchange membrane obtained by introducing, into an engineering plastic material typified by a polysulfone, polyetherketone, polyetheretherketone or polybenzimidazole type polymer, a desired functional group as necessary to produce a hydrocarbon-based anion exchange resin and casting it to produce a membrane.

The solid polymer electrolyte fuel cell membrane of the present invention is preferably an anion exchange membrane constituted by a porous membrane as a substrate and a crosslinked, hydrocarbon-based anion exchange resin filled in the voids of the porous membrane. In such an anion exchange membrane wherein a hydrocarbon-based anion exchange resin is dispersed in a porous membrane, the porous membrane functions as a reinforcing material. By employing the above constitution, the anion exchange membrane can have an enhanced physical strength without increasing its electric resistance.

The thickness of the porous membrane is preferably 3 to 50 µm. The thickness is more preferably 3 to 15 µm in order to obtain a membrane of low resistance, high water permeability, etc. The thickness is most preferably 5 to 15 µm in view of the balance between low fuel permeability and required mechanical strength.

As described previously, the water permeability at 25° C. of the solid polymer electrolyte fuel cell membrane of the present invention is 1,400 g·m$^{-2}$·hr$^{-1}$ or greater. Here, the measurement method of the water permeability is described in detail in the Examples described later.

In short, the water permeability is measured by the following measurement method. That is, a 30 mass % aqueous ethanol solution is contacted with one side of the fuel cell membrane of hydroxide ion type, at 25° C. To other side of the membrane is fed dry argon gas. In this state, there is measured the mass of the water which moves from the one side to the other side (argon gas) through the membrane.

The water permeability of membrane give a great influence on the amount of the water fed to the oxidant diffusion electrode side. With a greater water permeability, the membrane in the vicinity of the oxidant diffusion electrode dries less and the water required for the reaction taking place at the oxidant diffusion electrode can be fed sufficiently. As a result, a higher output voltage of fuel cell can be obtained. For this reason, the water permeability of membrane at 25° C. is preferably 1,600 to 5,000 g·m$^{-2}$·hr$^{-1}$, more preferably 1,800 to 5,000 g·m$^{-2}$·hr$^{-1}$.

The reason why the water permeability of membrane has a great influence on the output voltage of fuel cell, is considered as follows. That is, in the solid polymer fuel cell using an anion exchange membrane, since water is consumed by the reaction taking place at the oxidant diffusion electrode, the membrane in the vicinity of the oxidant diffusion electrode gets dry easily. As a result, the electric resistance of the membrane increases and the water required for the reaction becomes short, which invites an increase in the reaction overvoltage of the oxidant diffusion electrode. For these reasons, the output voltage decreases.

The feeding of water to the oxidant diffusion electrode is insufficient by enhancing merely the humidity of the oxidant gas fed. It is necessary to feed the water to the oxidant diffusion electrode through the membrane, which water is generated at the fuel diffusion electrode during the power generation or the water contained in the aqueous solution when a fuel of aqueous solution type is used. The reduction in output voltage caused by the shortage of the water fed tends to occur particularly in long-term operation of fuel cell. When a gas fuel such as hydrogen gas or the like is used, as compared with when a liquid fuel of aqueous solution type is used, the amount of the water fed to the oxidant diffusion electrode through the membrane tends to be short and accordingly the output voltage tends to decrease.

When the operation of fuel cell is conducted at a high current density, the amount of the hydroxide ion moving from the oxidant diffusion electrode to the fuel diffusion electrode is large; consequently, the amount of the water moving together with the hydroxide ion becomes large. As a result, the shortage of water at the oxidant diffusion electrode becomes striking and the reduction in output voltage appears easily. Specifically explaining, when the operation of fuel cell is conducted at high temperatures or when an electrolyte is added to a liquid fuel of aqueous solution type, the operation at a high current density becomes possible but the reduction in output voltage due to the shortage of water occurs easily.

The control of the water permeability of the solid polymer electrolyte fuel cell membrane at 1,400 g·m$^{-2}$·hr$^{-1}$ or greater can be made, for example, by the adjustment of the thickness and porosity of porous membrane and the crosslinking degree of the anion exchange resin filled in the porous membrane.

In the present invention, the crosslinking degree of ion exchange resin is defined as the mol % of the polymerizable crosslinking agent unit contained in the hydrocarbon polymer constituting the ion exchange resin, relative to the total amount of the polymerizable crosslinking agent unit and the polymerizable monomer unit having an anion exchange group or convertible to an anion exchange group.

As the thickness of the porous membrane is smaller, its porosity is larger, and the crosslinking degree of the anion exchange resin filled in the porous membrane is smaller, the water permeability of the fuel cell membrane obtained is greater.

Although it differs depending upon the pore diameter of the porous membrane and the chemical structure of the anion exchange resin filled therein, preferable combinations of the thickness and porosity of porous membrane and the crosslinking degree of anion exchange resin (described later) are shown in the following examples.

For example, when the thickness of porous membrane is 3 to 15 µm, it is preferable that the porosity is 20 to 95% and the crosslinking degree is 0.4 to 15 mol %.

When the thickness of porous membrane is larger than 15 µm to 50 µm, it is preferable that the porosity is 20 to 95% and the crosslinking degree is 0.1 to 4 mol %.

In particular, when the thickness of porous membrane is 3 to 15 µm, it is preferable that the porosity is 30 to 80% and the crosslinking degree is 0.4 to 15 mol %, more preferably 1 to 10 mol %.

In a more preferable combination, it is preferred that the thickness of porous membrane is 5 to 15 µm, its porosity is 30 to 50% and the crosslinking degree is 1 to 10 mol %, more preferably 1 to 4 mol %.

As the crosslinking degree of the anion exchange resin is smaller, it happens generally that the water permeability increases and the fuel permeability increases as well. Therefore, a crosslinking degree of the anion exchange resin, of smaller than 1.0 mol % is not preferred because the fuel permeability increases. In this case, it is preferred to increase the water permeability by making small the thickness of the porous membrane.

Incidentally, in order to adjust the crosslinking degree of the anion exchange resin in the above-mentioned range, the content of the crosslinking agent in the polymerizable monomers composition (which is a raw material for production of anion exchange resin) is adjusted as described later. The polymerizable components in the polymerizable monomers mixture polymerize almost quantitatively. Therefore, the crosslinking degree of the anion exchange resin can be adjusted by adjusting the amount of the crosslinking agent in the mixture.

As the porous membrane used in the present invention, there can be used known commercial products, etc. as long as they satisfy the above-described requirements for the substrate of ion exchange membrane. As the porous membrane, there can be used porous film, non-woven paper, woven fabric, paper, inorganic membrane, etc. with no restriction. As the raw material of the porous membrane, there can be mentioned thermoplastic resin composition, thermosetting resin composition, inorganic material, mixture thereof, etc. A hydrocarbon-based porous membrane is preferred and a polyolefin type porous membrane is preferred particularly, because it is easy to produce, is superior in mechanical strength, chemical stability and chemical resistance, and has good affinity with hydrocarbon-based anion exchange resin.

As the form of the porous membrane, a porous film is preferred. By employing the porous film, it is possible to obtain a membrane having a small thickness for small electric resistance, a large water permeability and a high adhesion ability with catalyst electrode layer.

As specific examples of the polyolefin type porous film, there can be mentioned porous films produced from polyolefins obtained by homo-polymerization or co-polymerization of α-olefins such as ethylene, propylene, 1-butene, 1-pentene, 1-hexene, 3-methyl-1-butene, 4-methyl-1-pentene, 5-methyl-1-heptene and the like. Of these, a porous film made of a polyethylene or a polypropylene is preferred particularly, and a porous film made of a polyethylene is preferred most.

The polyolefin type porous film can be obtained by a method described in JP 1997-216964 A, JP 2002-338721 A or the like. Or, it can be obtained as a commercial product such as "Hipore" of Asahi Chemical Industry Co., Ltd., "U-pore" of Ube Industries, Ltd., "Setera" of Tonen Tapils Co., Ltd., "Excelpor" of Nitto Denko Corporation, "Hilet" of Mitsui Chemicals, Inc., or the like.

The average pore diameter of the porous film is generally 0.005 to 5.0 μm, preferably 0.01 to 1.0 μm, more preferably 0.015 to 0.4 μm, in view of the resistance, mechanical strength, etc. of the anion exchange membrane obtained.

The porosity of the porous film is generally 20 to 95%, more preferably 30 to 80%, most preferably 30 to 50% from the same standpoints as for the average pore diameter and the standpoint of greater water permeability.

Incidentally, the average pore diameter of porous film is measured by the half dry method based on ASTM F 316-86. The porosity of porous film is obtained by measuring the volume (V cm$^3$) and mass (U g) of porous film, taking the density of the material of porous film as X (g·cm$^{-3}$), and calculating the following expression.

$$\text{Porosity}=[(V-U/X)/V]\times 100(\%)$$

In the present invention, in the hydrocarbon-based anion exchange resin filled in the voids of the porous film, the matrix portion excluding the anion exchange group is preferably constituted by a crosslinked hydrocarbon polymer. Here, the hydrocarbon polymer indicates a polymer in which the majority of the bonds of the main chain and side chains constituting the polymer are carbon-carbon bond. Between the carbon-carbon bonds constituting the main chain and side chains, there may be present a small amount of elements other than carbon, such as oxygen, nitrogen, silicon, sulfur, boron, phosphorus and the like, which atoms constitute ether linkage, ester linkage, amide linkage, siloxane linkage, etc. All of the elements bonding to the main chain and side chains need not be hydrogen atom. The elements bonding to the main chain and side chains may be replaced, in a small amount, by other elements such as chlorine, bromine, fluorine, iodine and the like, or by substituent groups containing the other elements. The amount of the elements other than carbon and hydrogen is preferred to be 40 mol % or less, preferably 10 mol % or less of the total elements constituting the matrix portion of resin excluding the anion exchange group.

As the anion exchange group possessed by the hydrocarbon-based anion exchange resin, there can be used anion exchange groups possessed by known hydrocarbon-based anion exchange resin membranes, with no restriction. Specifically, there can be mentioned primary to tertiary amino groups, quaternary ammonium salt group, pyridyl group, imidazole group, quaternary pyridinium salt group, etc. The anion exchange group is preferably quaternary ammonium salt group or quaternary pyridinium salt group, most preferably quaternary ammonium salt group, from the standpoint of, for example, the high conductivity of hydroxide ion and the easy procurement of raw material for membrane production.

Preferably, the hydrocarbon-based anion exchange resin is insoluble in liquid fuel and water as highly as possible and has fuel non-permeability. For this reason, the resin preferably has therein a crosslinked structure based on covalent bond. The crosslinked structure can be formed, as described later, by adding a crosslinking agent to a polymerizable monomers mixture used in production of anion exchange membrane, in an appropriate amount described later.

When there is used, as the solid polymer electrolyte fuel cell membrane of the present invention, an anion exchange membrane constituted by a porous film as a substrate and a crosslinked, hydrocarbon-based anion exchange resin filled in the voids of the porous film, the substrate functions as a reinforcing material, allowing the membrane to have an enhanced mechanical strength. That is, when the membrane is produced using a porous film of 3 μm in thickness, the membrane has a burst strength of ordinarily 0.08 MPa or higher. A membrane using a porous film as the substrate has a high burst strength; therefore, when it is incorporated into a fuel cell, the generation of cracks in the membrane can be prevented. Further, there can be prevented the generation of pinholes which appears by sticking, into the membrane, of carbon fiber ends which may protrude from the carbon paper ordinarily used as a gas diffusion electrode.

The anion exchange membrane containing a hydrocarbon-based anion exchange resin, used as the fuel cell membrane of the present invention generally has an anion exchange capacity of 0.2 to 5.0 mmol·g$^{-1}$, preferably 0.5 to 3.5 mmol·g$^{-1}$. Its water content is ordinarily kept at 7 mass % or greater, preferably at about 10 to 90 mass % in deionized water of 25° C.

With such water content, the drying of the membrane and subsequent reduction in hydroxide ion conductivity can be prevented.

The solid polymer electrolyte fuel cell membrane of the present invention can be produced by appropriately employing a known method. For example, it may be produced by introducing an anion exchange group into an engineering plastic by a known method and casting the resulting resin to produce a membrane. Or, the membrane may be produced by applying an electron beam to a woven fabric or a porous film, then graft-polymerizing thereon a polymerizable monomer, thereafter introducing, into the polymer obtained, an anion exchange group as necessary.

In the most preferred production method, a polymerizable monomers mixture comprising a polymerizable monomer having an anion exchange group or a group which can be converted to an anion exchange group, a crosslinking agent and a polymerization initiator, is infiltrated into the voids of the above-mentioned porous film, and the polymerizable monomer mixture infiltrated is polymerized.

A known polymerizable monomer can be used with no restriction as the polymerizable monomer having an anion exchange group or a group which can be converted to an anion exchange group.

As the polymerizable monomer having an anion exchange group, there can be mentioned, for example, amine monomers such as vinylbenzyldimethylamine, vinylbenzyldiethylamine and the like; nitrogen-containing heterocyclic monomers such as vinylpyridine, vinylimidazole and the like; (meth)acrylate monomers such as chlorinated trimethylaminoethyl (meth)acrylate and the like; and salts and derivatives thereof.

As specific examples of the polymerizable monomer having a group which can be converted into an anion exchange group, there can be mentioned polymerizable monomers having halogenoalkyl group, such as chloromethylstyrene, bromomethylstyrene, iodomethylstyrene, chloroethylstyrene, bromoethylstyrene, iodoethylstyrene and the like.

As to the crosslinking agent, there is no particular restriction. There can be used, for example, divinyl compounds such as divinylbenzene, divinylsulfone, butadiene, chloroprene, divinylbiphenyl, trivinylbenzene, divinylnaphthalene, diallylamine, divinylpyridine and the like.

As the polymerization initiator, known compounds can be used with no particular restriction. There can be mentioned, for example, organic peroxides such as octanoyl peroxide, lauroyl peroxide, tert-butyl peroxy-2-ethylhexanoate, benzoyl peroxide, tert-butyl peroxyisobutylate, tert-butyl peroxylaurate, tert-hexyl peroxybenzoate, di-tert-butyl peroxide and the like.

In the polymerizable monomers mixture, the proportions of the polymerizable monomer having an anion exchange group or a group which can be converted to an anion exchange group, the crosslinking agent and the polymerization initiator may be in wide ranges as long as each component is present in an amount necessary for the polymerization.

The proportion of the crosslinking agent is preferably 0.4 to 15 mol %, more preferably 1 to 10 mol %, most preferably 1 to 4 mol %, of the total amount of the polymerizable monomer having an anion exchange group or a group which can be converted to an anion exchange group and the crosslinking agent. By controlling the proportion of the crosslinking agent in the above range, the membrane obtained can have large water permeability and small fuel permeability.

The polymerization initiator is used in an amount of generally 0.1 to 20 mass parts, preferably 0.5 to 10 parts by mass relative to 100 mass parts of the polymerizable monomer having an anion exchange group or a group which can be converted to an anion exchange group.

In producing the membrane, the polymerizable monomers mixture is contacted with the porous membrane, as described previously. The contact is conducted, for example, by coating or spraying the polymerizable monomers mixture on the porous membrane, or by immersing the porous membrane in the polymerizable monomers mixture. The immersion is particularly preferable because it allows for easy production of the membrane. The time of immersion differs depending upon the kind of porous membrane and the composition of monomers composition, but is generally 0.1 second to ten and odd minutes.

In polymerizing the polymerizable monomers mixture filled in the porous membrane, a known polymerization method is employed with no restriction. Thermal polymerization using a polymerization initiator (which is the above-mentioned peroxide) is preferred generally because the operation is easy and polymerization can be conducted relatively uniformly. The polymerization is preferably conducted after covering the porous membrane with a film of polyester or the like. By covering the porous membrane with a film, the hindrance of polymerization by oxygen is prevented and surface smoothness is obtained; further, the excessive portion of the polymerizable monomers mixture is removed and a thin and uniform anion exchange membrane can be obtained.

The temperature of the thermal polymerization is not particularly restricted and a known temperature condition may be selected appropriately. It is generally 50 to 150° C., preferably 60 to 120° C. Incidentally, when the polymerizable monomers mixture contains a solvent, the solvent may be removed prior to the polymerization.

When there is used, as the polymerizable monomer, a polymerizable monomer having an anion exchange group, the membrane-shaped material obtained by polymerizing the polymerizable monomers mixture filled in the porous membrane can be used per se as the anion exchange resin membrane used in the present invention.

When there is used a polymerizable monomer into which an anion exchange group can be introduced, an anion exchange group is introduced into the membrane-shaped material obtained. The method of introduction of anion exchange group is not particularly restricted and a known method such as amination, alkylation or the like may be adopted appropriately.

For example, when chloromethylstyrene is used as the polymerizable monomer, the membrane-shaped material obtained is contacted with an aminating compound such as trimethylamine or the like, whereby the material can be converted to an anion exchange membrane having a quaternary ammonium salt group.

When vinylpyridine is used as the polymerizable monomer, the membrane-shaped material obtained is contacted with methyl iodide or the like, whereby the material can be converted to an anion exchange membrane having a quaternary pyridinium salt group.

When there is used, as the polymerizable monomer, a polymerizable monomer having an anion exchange group, it is possible to as necessary introduce further an anion exchange group into the membrane-shaped material obtained, in order to enhance the density of anion exchange group.

When the anion exchange membrane obtained by any of the above-mentioned methods is used as a fuel cell membrane, the counter ion of the anion exchange membrane is ordinarily ion-exchanged to hydroxide ion. There is no particular restriction as to the method of ion exchange, and a known method, for example, immersion of anion exchange membrane in aqueous solution of sodium hydroxide or potassium hydroxide can be employed.

Incidentally, the present inventors found that the anion exchange membrane wherein the counter ion of anion exchange group is hydroxide ion, when allowed to stand in the air, absorbs carbon dioxide quickly and the counter ion is changed to carbonate ion and further to bicarbonate ion. The carbonate ion and bicarbonate ion, however, are ion-exchanged by the hydroxide ion generated at the oxidant diffusion electrode during the power generation of fuel cell and are discharged to outside the fuel cell. Therefore, the anion exchange membrane wherein the counter ion of anion exchange group is carbonate ion and/or bicarbonate ion, can as well be used in fuel cell with no problem.

The anion exchange membrane produced is washed and cut as necessary and is used as a membrane for solid polymer electrolyte fuel cell according to the usual way.

A diffusion electrode is bonded to at least one side of the fuel cell membrane of the present invention produced as above, whereby a membrane-electrode assembly for solid polymer electrolyte fuel cell of the present invention is obtained. The diffusion electrode is bonded preferably to both sides of the fuel cell membrane of the present invention.

The diffusion electrode comprises a catalyst electrode layer made of metal particles of catalyst and a binder resin for bonding the metal particles. The bonding of the diffusion electrode and the fuel cell membrane is conducted, in one method, by first forming a catalyst electrode layer on an electrode made of an electron-conductive porous material, to produce a diffusion electrode and then bonding this diffusion electrode to the fuel cell membrane of the present invention. Or, the bonding is conducted by bonding a diffusion electrode consisting only of a catalyst electrode layer to the fuel cell membrane and laminating an electrode made of a porous material, on the diffusion electrode bonded. The method of bonding is described later.

As the binder resin used in the catalyst electrode layer, an ionic group-free resin such as polytetrafluoroethylene or the like may be used. However, the resin preferably contains an anion-conductive substance for the enhancement of conductivity of hydroxide ion in catalyst electrode layer to reduce internal resistance of fuel cell and also to increase higher utilization of catalyst.

Any ion-conductive substance can be used with no particular restriction as long as it has an anion exchange functional group and has conductivity of hydroxide ion. Specifically, there can be mentioned a resin having a desired anion exchange group introduced thereinto, which is obtained by aminating the chloromethyl group possessed in polychloromethylstyrene, poly(styrene-chloromethylstyrene) copolymer, polybromoethylstyrene, polybromobutylstyrene, chloromethylated polysulfone, choromethylated polyphenylene oxide, chloromethylated polyetheretherketone or the like, with an aminating agent such as trimethylamine, triethylamine or the like, to convert the chloromethyl group to quaternary ammonium type.

Or, there can be used a resin having a desired anion exchange group introduced thereinto, which is obtained by allowing an alkylating agent such as methyl iodide or the like to react with poly-(4-vinylpyridine), poly-(2-vinylpyridine), polyvinylimidazole, polybenzimidazole or the like.

Of these, there is preferably used a hydrocarbon-based elastomer having an anion exchange group inside and hardly soluble in water and methanol, such as disclosed in JP 2002-367626 A, in view of the high adhesion between catalyst electrode layer and fuel cell membrane, the insolubility in liquid fuel, etc.

As the catalyst in the catalyst electrode layer, any metal capable of promoting the oxidation reaction of fuel (e.g. hydrogen, methanol or ethanol) and the reduction reaction of oxygen can be used with no particular restriction. There can be mentioned, for example, platinum, gold, silver, palladium, iridium, rhodium, ruthenium, tin, iron, cobalt, nickel, molybdenum, tungsten, vanadium and alloys thereof. Of these catalysts, preferred are platinum, ruthenium and a platinum-ruthenium alloy, all of which are superior in catalytic activity. Also, preferred are transition metals such as iron, cobalt, nickel and the like, from the cost standpoint. The particle diameters of these catalyst metals are ordinarily 0.1 to 100 nm, more preferably 0.5 to 10 nm. Smaller diameters give higher catalytic activity, but metal particles having diameters of less than 0.5 nm are difficult to produce and those having diameters of more than 100 nm are unable to exhibit sufficient catalytic action. Incidentally, the catalyst may be used by being loaded on a conductive material.

As to the conductive material, there is no particular restriction as long as it is an electron-conductive substance. Particularly preferred is a carrier consisting conductive carbon [e.g. carbon black (e.g. furnace black or acetylene black), active carbon or graphite] having the above-mentioned catalyst loaded thereon. The conductive carbon having a catalyst loaded thereon, usable as the electrode for fuel cell is described in, for example, JP 2002-329500 A, JP 2002-100373 A, JP 1995-246336 A, etc. As the conductive materials having a catalyst loaded thereon, many of different in catalyst or carrier are available commercially, and they can be used per se or after applying a necessary treatment thereto.

The content of the catalyst metal is ordinarily 0.01 to 10 mg/cm$^2$, preferably 0.1 to 5.0 mg/cm$^2$ in a state that the catalyst electrode layer has been made in a sheet. When the content of the catalyst is less than 0.01 mg/cm$^2$, no sufficient catalytic activity is exhibited and, when the content is more than 10 mg/cm$^2$, the catalytic activity is saturated.

By bonding the diffusion electrode comprising the catalyst electrode layer made of these components, with the fuel cell membrane of the present invention, there can be obtained a membrane-electrode assembly for fuel cell. Preferably, the catalyst electrode layer is formed on the surface of the fuel cell membrane in a thickness of 5 to 50 μm.

Generally, the catalyst electrode layer is produced by coating a catalyst electrode paste (which is a mixture of the above-mentioned components and an organic solvent) on the surface of the membrane, followed by drying. As the method for coating, screen printing or spraying can be mentioned, for example. The loaded catalyst amount and the thickness of the catalyst electrode layer are controlled by adjusting the viscosity of the catalyst electrode paste. The adjustment of the viscosity is conducted by adjusting the amount of the organic solvent added in the catalyst electrode paste.

As the preferred method employable for directly forming the catalyst electrode layer on the fuel cell membrane of the present invention, there is a method of forming, in advance, a catalyst electrode layer on a polytetrafluoroethylene or polyester film and transferring the catalyst electrode layer onto a fuel cell membrane. The transfer of the catalyst electrode layer is conducted generally by thermocompression bonding using an apparatus capable of applying a pressure and a heat, such as hot press, roll press or the like. The pressing temperature is generally 40° C. to 200° C. The pressing pressure is ordinarily 0.5 to 20 MPa although it differs depending on the thickness and hardness of the catalyst electrode layer used.

The membrane-electrode assembly for fuel cell, of the present invention may also be produced by loading a catalyst electrode layer on a porous electrode substrate as described previously and then bonding the catalyst electrode layer to a membrane. As the porous electrode substrate, there can be mentioned, for example, carbon fiber woven fabric and carbon paper. The thickness of the electrode substrate is preferably 50 to 300 μm and the porosity thereof is preferably 50 to 90%. The membrane-electrode assembly is produced by coating the above-mentioned catalyst electrode paste on the electrode substrate, followed by drying, and then bonding the resulting catalyst electrode layer to the fuel cell membrane of the present invention by thermocompression bonding in the same manner as above.

The solid polymer electrolyte fuel cell produced using the membrane of the present invention has generally a basic structure of FIG. 1. The membrane of the present invention may also be used in a solid polymer electrolyte fuel cell having other known structure. As the fuel, hydrogen gas and liquid fuels such as methanol, ethanol and the like are most common. When these fuels are used, the effect of the present invention is exhibited most strikingly. The same excellent effect is exhibited also with ethylene glycol, dimethyl ether, hydrazine, ammonia, etc.

When a liquid fuel is used, a basic compound may be added thereto. By adding a basic compound, ion conductivity is imparted to the liquid fuel and power generation of high output is obtained in some cases. As the basic compound, there can be mentioned, for example, potassium hydroxide, sodium hydroxide, potassium hydrogencarbonate and sodium hydrogencarbonate. The appropriate concentration of the basic compound added is 0.05 to 3 mol/l.

EXAMPLES

The present invention is described in more detail below by way of Examples. However, the present invention is in no way restricted to these Examples.

In the following Examples and Comparative Examples, the properties of each fuel cell membrane were measured by the following methods.

1) Anion Exchange Capacity and Water Content

An anion exchange membrane was immersed in a 0.5 mol/l aqueous NaCl solution for at least 10 hours to convert the membrane into chloride ion type. Then, the membrane was converted to nitrate ion type using a 0.2 mol/l aqueous $NaNO_3$ solution. The chloride ion liberated was quantitatively determined using an aqueous silver nitrate solution using a potentiometric titration apparatus (COMTITE-900, product of HIRANUMA Sangyo K.K.) (A mol).

In the measurement of water content, the same ion exchange membrane was immersed in a 0.5 mol/l aqueous NaCl solution at 25° C. for at least 4 hours. Then, the membrane was sufficiently washed with deionized water. The deionized water remaining on the membrane was wiped off using a tissue paper or the like, after which the wet weight (W g) of the membrane was measured. Then, the membrane was dried at 60° C. for 5 hours under reduced pressure and measured for dry weight (D g). Based on these measurement data, the ion exchange capacity and water content of the membrane were calculated using the following formulas.

Ion exchange capacity=$A \times 1000/D$ (mmol·$g^{-1}$–dried mass)

Water content=$100 \times (W-D)/D$(%)

2) Average Pore Diameter of Porous Film

Measured by the half dry method based on ASTM F 316-86.

3) Porosity of Porous Film

A porous film was measured for volume (V $cm^3$) and mass (U g). The density of the polyethylene (a material resin of the porous film) was taken as 0.9 (g/$cm^3$). The porosity of the porous film was calculated from the following formula.

Porosity=$[(V-U/0.9)/V] \times 100$(%)

4) Membrane Resistance

A fuel cell membrane was immersed in a 0.5 mol/l aqueous NaOH solution for at least 10 hours to convert the membrane to a hydroxide ion type. Then, the membrane was washed with pure water and then dried at room temperature for at least 24 hours.

An insulating substrate was prepared, on which 5 platinum wires of 0.3 mm in width were fixed apart in parallel. To the 5 platinum wires was pressed a rectangular fuel cell membrane of 2.0 cm in width wetted with pure water. The substrate with pressed fuel cell membrane was placed in a thermohygrostat of 40° C. After confirming that the fuel cell membrane had been in a wet state, an AC of 1 kHz was applied between the platinum wires and an AC impedance was measured.

In the measurement of AC impedance, the interval between the platinum wires was changed between 0.5 cm and 2.0 cm and an impedance was measured at each interval. The impedance was plotted against the interval between platinum wires and the specific resistance of the fuel cell membrane was calculated from the impedance gradient (resistance-wires interval gradient), whereby the influence of the contact resistance appearing between the platinum wires and the fuel cell membrane was removed. A good straight-line relationship was obtained between the interval of platinum wires and the impedance measured. Using the resistance-wires interval gradient and the membrane thickness, the electric resistance of the fuel cell membrane was calculated using the following expression.

Incidentally, all the above measurements were conducted in a glove box purged with nitrogen.

$R=\{S \times (L \times 2.0)\} \times L$

R: membrane resistance ($\Omega \cdot cm^2$)
L: membrane thickness (cm)
S: resistance-wires interval gradient ($\Omega$/cm)

5) Water Permeability and Ethanol Permeability

A fuel cell membrane was immersed in a 0.5 mol/l aqueous NaOH solution for at least 10 hours to convert the membrane to a hydroxide ion type. Then, the membrane was washed with pure water and then dried at room temperature for at least 24 hours.

The membrane was incorporated into a single fuel cell (area of permeation part: 5 $cm^2$). Into the fuel chamber was fed an aqueous solution containing 30 mass % of ethanol, using a pump for liquid chromatography. Into the oxidant chamber was fed argon gas at a rate of 300 ml·$min^{-1}$.

The measurement of permeability was conducted in a thermostat of 25° C. The amounts of water and ethanol both permeated through the fuel cell membrane were measured using a gas chromatograph equipped with a gas sampler.

6) Output Voltage of Fuel Cell

A binder resin for catalyst electrode layer was synthesized using, as the raw material, a chloromethylated {polystyrene-poly(ethylene-butylene)-polystyrene} tri-block copolymer (styrene content: 30 mass %). The tri-block copolymer was first immersed in an aqueous solution containing 6 mass % of trimethylamine and 25 mass % of acetone, at room temperature for 16 hours and then immersed in a 0.5 mol/l aqueous NaOH solution for at least 10 hours, to obtain a binder resin for catalyst electrode layer. The binder resin had a weight-average molecular weight of 30,000 and an anion exchange capacity of 1.5 mmol/g-dry resin).

The binder resin was dissolved in an equal mass mixed solvent of tetrahydrofuran and 1-propanol, to obtain a binder resin solution of 5 mass % concentration.

Then, the binder resin solution was mixed with a carbon black having a platinum-ruthenium alloy catalyst (ruthenium: 50 mol %) loaded thereon by 50 mass %, to form a slurry for formation of catalyst electrode layer. The slurry was coated on a carbon paper of 100 μm in thickness, 80% in porosity and subjected to a treatment for water repellency by polytetrafluoroethylene, so that the catalyst amount became 2 mg·cm$^{-2}$; thereafter, the slurry-coated carbon paper was dried under reduced pressure at 80° C. for 4 hours to obtain a fuel diffusion electrode having an catalyst electrode layer.

Meanwhile, using a carbon black having platinum loaded thereon by 50 mass %, an oxidant diffusion electrode was produced in the same manner as in the case of the fuel diffusion electrode.

Next, the fuel diffusion electrode and the oxidant diffusion electrode were set on the both sides of a fuel cell membrane to be measured, then hot-pressed at 100° C. for 100 seconds at a pressure of 5 MPa, then allowed to stand at room temperature for 2 minutes to obtain a membrane-electrode assembly for fuel cell. The assembly was incorporated into a fuel cell having structure shown in FIG. 1.

The fuel cell was kept at 50° C. Into the fuel chamber was fed a 10 mass % aqueous ethanol solution containing 5 mass % of KOH and into the oxidant chamber was fed an air of atmospheric pressure at a rate of 200 ml·min$^{-1}$, whereby a power generation test was conducted. Cell termination voltages at current densities of 0 A·cm$^{-2}$ and 0.1 A·cm$^{-2}$ were measured.

7) Evaluation of Output Voltage Stability

After the above measurement of output voltage, a continuous power generation test was conducted at 50° at 0.1 A·cm$^{-2}$. An output voltage after 100 hours was measured to evaluate the stability of output voltage.

Examples 1 to 5

Polymerizable monomers mixtures were obtained according to the formulations shown in Table 1. 400 g of each polymerizable monomers mixture was placed in a 500-ml glass vessel. Therein was immersed a porous film (20 cm×20 cm) shown in Table 1.

Then, the porous film was taken out from the polymerizable monomers mixture. The both sides of the porous film were covered with a peeling material (a polyester film of 100 μm in thickness), after which thermal polymerization was conducted at a nitrogen pressure of 0.3 MPa at 80° C. for 5 hours.

The membrane-shaped polymer obtained was immersed in an aqueous solution containing 6 mass % of trimethylamine and 25 mass % of acetone, at room temperature for 16 hours to give rise to amination. Then, the aminated membrane-shaped polymer was immersed in a 0.5 ml/l aqueous NaOH solution for at least 10 hours to convert the membrane-shaped polymer to hydroxide ion type, after which the hydroxide ion type polymer was washed with pure water to obtain each fuel cell membrane.

Each fuel cell membrane was measured for properties.

The results are shown in Table 2.

TABLE 1

| Example | Porous film[1] | Formulation of polymerizable monomers mixture (mass parts) | | | | | Proportion of DVB[7] (mol %) |
| --- | --- | --- | --- | --- | --- | --- | --- |
| | | CMS[2] | 4VP[3] | DVB[4] | PO[5] | EP[6] | |
| 1 | A | 100 | 0 | 3 | 5 | 5 | 3.4 |
| 2 | A | 100 | 0 | 8 | 5 | 5 | 8.6 |
| 3 | B | 100 | 0 | 3 | 5 | 5 | 3.4 |
| 4 | C | 100 | 0 | 3 | 5 | 5 | 3.4 |
| 5 | D | 100 | 0 | 0.8 | 5 | 5 | 0.9 |
| 6 | A | 0 | 100 | 3 | 5 | 5 | 2.4 |
| 7 | A | 0 | 100 | 8 | 5 | 5 | 6.1 |
| Comp. Ex. 1 | A | 100 | 0 | 20 | 5 | 5 | 19.0 |
| Comp. Ex. 2 | D | 100 | 0 | 4 | 5 | 5 | 4.5 |
| Comp. Ex. 3 | A | 0 | 100 | 23 | 5 | 5 | 15.7 |

[1]Porous film

A: Polyethylene, thickness: 9 μm, average pore diameter: 0.03 μm, porosity: 35%

B: Polyethylene, thickness: 12 μm, average pore diameter: 0.03 μm, porosity: 39%

C: Polyethylene, thickness: 16 μm, average pore diameter: 0.03 μm, porosity: 42%

D: Polyethylene, thickness: 25 μm, average pore diameter: 0.03 μm, porosity: 37%

[2]CMS: p-Chloromethylstyrene

[3]4-VP: 4-Vinylpyridine

[4]DVB: Divinylbenzene

[5]PO: tert-Butyl peroxyethylhexanoate

[6]EP: Epolight 40E (a product of Kyoeisha Chemical Co., Ltd.)

[7]Proportion in polymerizable monomers

TABLE 2

| Example | Film thickness ($\mu m$) | Ion exchange capacity ($mmol \cdot g^{-1}$) | Water content (%) | Membrane resistance ($\Omega \cdot cm^2$) | Water permeability ($g \cdot m^{-2} \cdot hr^{-1}$) | Ethanol Permeability ($g \cdot m^{-2} \cdot hr^{-1}$) | Fuel cell output (V) 0 A·cm$^{-2}$ | Fuel cell output (V) 0.1 A·cm$^{-2}$ | Durability (after 100 hours power generation) (V) 0.1 A·cm$^{-2}$ |
|---|---|---|---|---|---|---|---|---|---|
| 1 | 9 | 1.8 | 27 | 0.08 | 2700 | 450 | 0.85 | 0.45 | 0.43 |
| 2 | 9 | 1.6 | 18 | 0.19 | 2000 | 200 | 0.86 | 0.41 | 0.39 |
| 3 | 13 | 1.8 | 28 | 0.09 | 2150 | 400 | 0.85 | 0.43 | 0.41 |
| 4 | 17 | 1.9 | 28 | 0.12 | 1550 | 360 | 0.86 | 0.37 | 0.30 |
| 5 | 29 | 2.0 | 55 | 0.05 | 1580 | 800 | 0.80 | 0.35 | 0.29 |
| 6 | 9 | 2.1 | 33 | 0.09 | 2750 | 500 | 0.85 | 0.46 | 0.44 |
| 7 | 9 | 1.7 | 20 | 0.21 | 2020 | 230 | 0.86 | 0.41 | 0.39 |
| Comp. Ex. 1 | 9 | 1.4 | 8 | 0.40 | 1200 | 130 | 0.75 | 0.25 | 0.13 |
| Comp. Ex. 2 | 28 | 1.8 | 27 | 0.23 | 1350 | 300 | 0.85 | 0.30 | 0.19 |
| Comp. Ex. 3 | 9 | 1.5 | 10 | 0.42 | 1250 | 140 | 0.74 | 0.24 | 0.12 |

Examples 6 and 7

Membrane-shaped polymers were obtained in the same manner as in Example 1 except that there were used polymerizable monomers mixtures having formulations shown in Table 1.

Each membrane-shaped polymer obtained was immersed in a hexane solution containing 30 mass % of methyl iodide, at room temperature for 23 hours, for methylation. The methylated polymer was immersed in a 0.5 mol/l aqueous NaOH solution for at least 10 hours to convert the polymer to hydroxide ion type and then washed with pure water, to obtain each fuel cell membrane.

These fuel cell membranes were measured for properties. The results are shown in Table 2.

Comparative Examples 1 to 3

Using the porous membranes and polymerizable monomers mixtures shown in Table 1, fuel cell membranes of Comparative Examples 1 and 2 were obtained in the same manner as in Example 1.

A fuel cell membrane of Comparative Example 3 was obtained in the same manner as in Example 6. These fuel cell membranes were measured for properties. The results are shown in Table 2.

Examples 8 to 10

Membrane-electrode assemblies of the present invention were obtained as follows, using the fuel cell membranes produced in Examples 1 to 3.

That is, a binder resin for catalyst electrode layer was synthesized using, as the raw material, a chloromethylated {polystyrene-poly(ethylene-butylene)-polystyrene} tri-block copolymer (styrene content: 30 mass %). This tri-block copolymer was immersed in an aqueous solution containing 6 mass % of trimethylamine and 25 mass % of acetone, at room temperature for 16 hours and then in a 0.5 mol/l aqueous NaOH solution for at least 10 hours to obtain a binder resin for catalyst electrode layer. The binder resin had a weight-average molecular weight of 30,000 and an anion exchange capacity of 1.5 mmol/g-dry resin).

The binder resin was dissolved in an equal mass mixed solvent of tetrahydrofuran and 1-propanol, to obtain a binder resin solution of 5 mass % concentration.

Then, the binder resin solution was mixed with a carbon black having platinum of 2 nm in average particle diameter loaded thereon by 50 mass %, to produce a slurry for formation of catalyst electrode layer. The slurry was screen-printed on one side of a fuel cell membrane and dried in the air at 25° C. for at least 12 hours. In the same manner, a catalyst electrode layer was formed on the other side of the membrane, whereby a membrane-electrode assembly was obtained. At each side, the amount of platinum was 0.4 mg/cm$^2$ and the content of the binder resin in the catalyst electrode layer was 30 mass %. The area of each catalyst electrode layer was 5 cm$^2$.

Then, on each side of the membrane/catalyst assembly was placed a carbon cloth (EC-CC1-060T, a product of Electrochem) of 300 μm in thickness subjected to a treatment for water repellency by polytetrafluoroethylene. They were incorporated into a fuel cell shown in FIG. 1. Then, each fuel cell obtained was kept at 50° C. and subjected to a power generation test at a constant voltage of 0.2 V for 2 hours. Into the fuel chamber was fed hydrogen of 50° C. and 95% RH, at a rate of 50 ml/min. Into the oxidant chamber was fed high-purity air (carbon dioxide concentration: 0.1 ppm or less) of 50° C. and 95% RH, at a rate of 200 ml/min. Then, there were measured a cell voltage at a current density of 0 A/cm$^2$ (an open circuit voltage) and a cell voltage at 0.2 A/cm$^2$ to evaluate the output of each fuel cell. The results are shown in Table 3.

Comparative Examples 4 and 5

Membrane-electrode assemblies were produced in the same manner as in Example 8, using the fuel cell membranes produced in Comparative Examples 1 and 2. They were evaluated for output in hydrogen fuel system. The results are shown in Table 3.

Example 11

A membrane-electrode assembly of the present invention was obtained as follows, using the fuel cell membrane produced in Example 1.

That is, a slurry for formation of catalyst electrode layer was prepared by adding Raney nickel particles to the same binder resin solution as used in Example 8. The slurry was coated on a carbon paper of 100 μm in thickness and 80% in porosity, subjected to a treatment for water repellency by polytetrafluoroethylene, so that the catalyst became 1 mg·cm$^{-2}$, followed by drying under reduced pressure at 80° C. for 4 hours, to obtain a fuel diffusion electrode having a catalyst electrode layer.

Meanwhile, using a carbon black having platinum loaded thereon by 50 mass %, an oxidant diffusion electrode was produced in the same manner as in the case of the fuel diffusion electrode. The catalyst amount was 0.4 mg·cm$^{-2}$.

Then, the fuel diffusion electrode and the oxidant diffusion electrode were set on the different sides of a fuel cell membrane to be measured, and they were subjected to hot pressing at a pressure of 5 MPa at 100° C. for 100 seconds. Then, they were allowed to stand at room temperature for 2 minutes to obtain a membrane-electrode assembly for fuel cell.

The assembly was incorporated into a fuel cell having a structure shown in FIG. 1. The fuel cell was kept at 50° C. and subjected to a power generation test at a constant voltage of 0.2 V for 2 hours. Into the fuel chamber was fed hydrogen of 50° C. and 95% RH, at a rate of 50 ml/min. Into the oxidant chamber was fed high-purity air (carbon dioxide concentration: 0.1 ppm or less) of 50° C. and 95% RH, at a rate of 200 ml/min. After the power generation, there were measured a cell voltage at a current density of 0 A/cm$^2$ (an open circuit voltage) and a cell voltage at 0.025 A/cm$^2$ to evaluate the output of the fuel cell. The results are shown in Table 3.

Comparative Example 6

A membrane-electrode assembly was obtained in the same manner as in Example 11, using the fuel cell membrane produced in Comparative Example 1. The assembly was incorporated into a fuel cell having a structure shown in FIG. 1. The fuel cell was evaluated for output in hydrogen fuel system. The results are shown in Table 3.

TABLE 3

| Example | Fuel cell membrane | Output voltage of fuel cell (V) | | |
|---|---|---|---|---|
| | | 0 A/cm$^2$ | 0.025 A/cm$^2$ | 0.2 A/cm$^2$ |
| 8 | Same as in Ex. 1 | 0.97 | — | 0.55 |
| 9 | Same as in Ex. 2 | 0.95 | — | 0.45 |
| 10 | Same as in Ex. 3 | 0.97 | — | 0.54 |
| Comp. Ex. 4 | Same as in Comp. Ex. 1 | 0.84 | — | 0.25 |
| Comp. Ex. 5 | Same as in Comp. Ex. 2 | 0.96 | — | 0.32 |
| 11 | Same as in Ex. 1 | 0.97 | 0.25 | — |
| Comp. Ex. 6 | Same as in Comp. Ex. 1 | 0.78 | 0.05 | — |

The invention claimed is:

1. A solid polymer electrolyte fuel cell membrane comprising an anion exchange membrane, said membrane comprises a porous membrane of 30-50% in porosity and a cross-linked hydrocarbon-based anion exchange resin, of 1-4 mol % in crosslinking degree, which is filled in the void of the porous membrane, wherein the water permeability at 25° C. is 2,150-5,000 g·m$^{-2}$·hr$^{-1}$, the anion exchange capacity is 0.2 to 5.0 mmol·g$^{-1}$, the water content at 25° C. is 7% by mass or greater, and the thickness is 5-15 μm.

2. The solid polymer electrolyte fuel cell membrane according to claim 1, wherein the hydrocarbon-based anion exchange resin is a resin in which an anion exchange group is bonded to a crosslinked, hydrocarbon-based polymer.

3. A membrane-electrode assembly comprising a solid polymer electrolyte fuel cell membrane set forth in claim 1 and a diffusion electrode formed on at least one side of the solid polymer electrolyte fuel cell membrane.

4. The membrane-electrode assembly according to claim 3, wherein the diffusion electrode has a catalyst electrode layer.

5. A solid polymer electrolyte fuel cell wherein a solid polymer electrolyte fuel cell membrane set forth in claim 1 is incorporated.

* * * * *